Figure 1:
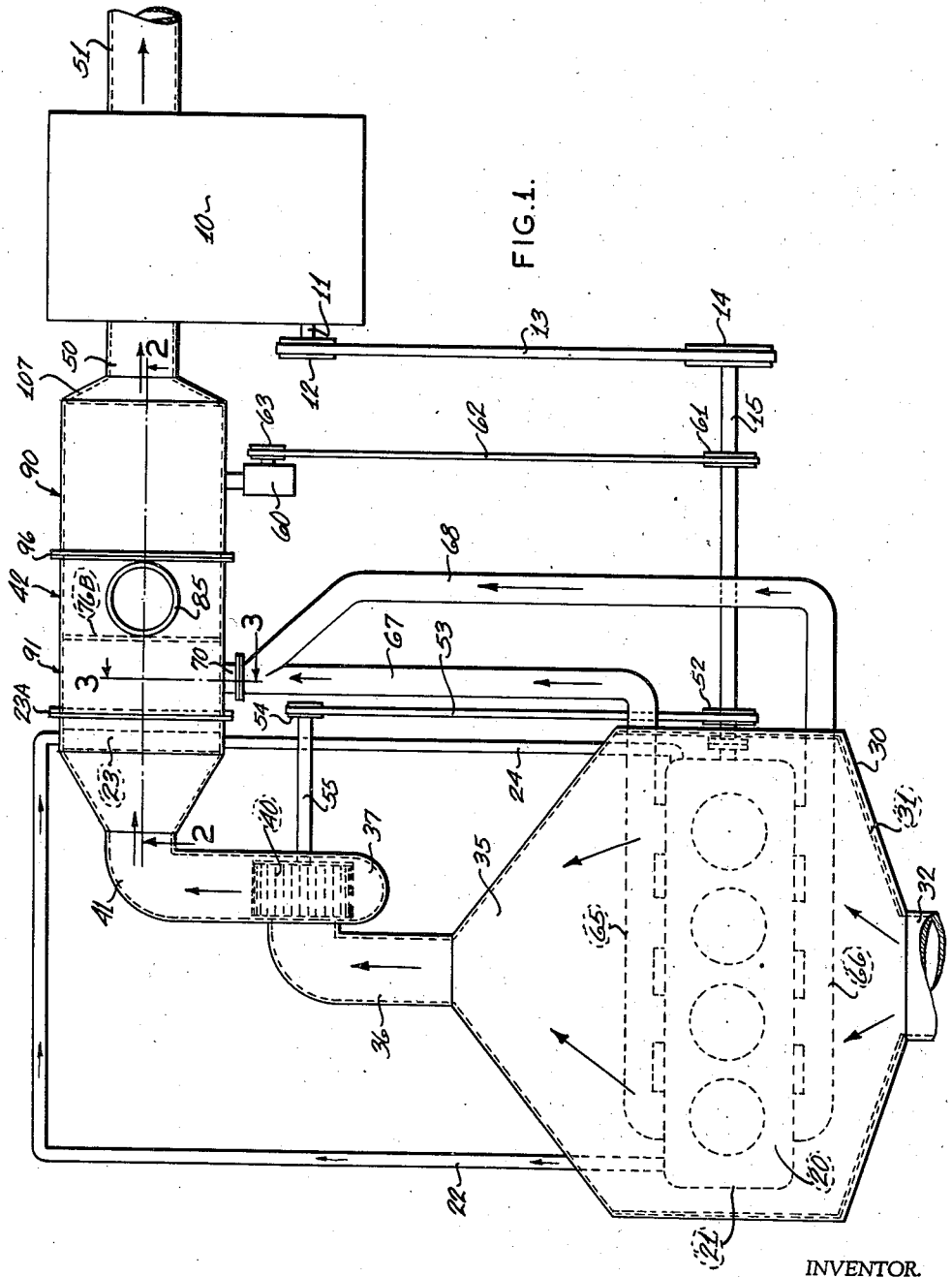

Sept. 16, 1941.  R. D. WILLIAMS  2,256,303
RECOVERY AND UTILIZATION OF WASTE ENGINE HEAT
Original Filed April 4, 1938  2 Sheets-Sheet 2
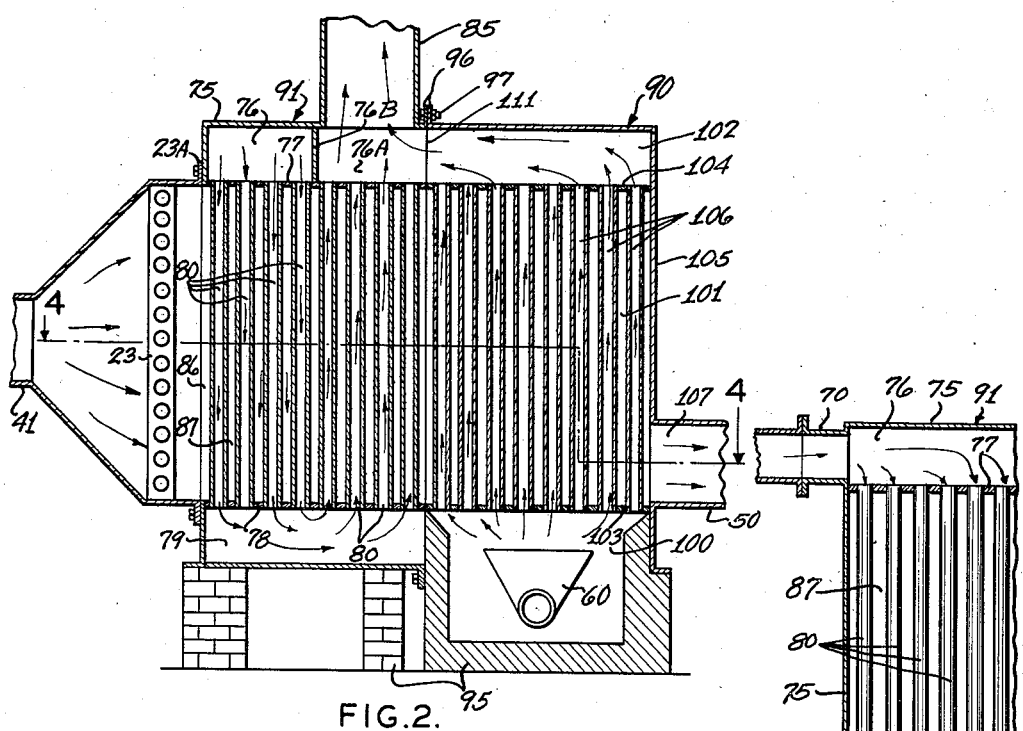
FIG.2.
FIG.3.
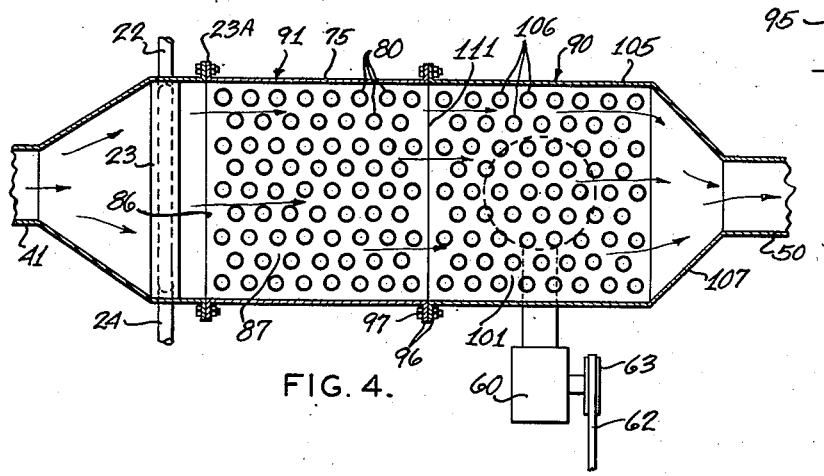
FIG.4.
INVENTOR.
ROBERT D. WILLIAMS
BY
ATTORNEY.

Patented Sept. 16, 1941

2,256,303

UNITED STATES PATENT OFFICE 2,256,303

RECOVERY AND UTILIZATION OF WASTE ENGINE HEAT

Robert D. Williams, Memphis, Tenn., assignor to Fairbanks, Morse & Co., Chicago, Ill., a corporation of Illinois Original application April 4, 1938, Serial No. 199,821. Divided and this application December 7, 1939, Serial No. 307,956

2 Claims. (Cl. 237—1)

This invention relates to improvements in the recovery and utilization of waste engine heat, and more particularly to an improved air heater and heat exchanger apparatus having particular utility in systems for thermally conditioning certain solid materials either prior to or while in process of mechanical treatment. The invention is particularly identified with an improved utilization of heat from the prime mover, such as an internal combustion engine, employed as a source of mechanical energy for processing such materials.

The present application is a division of my application for Letters Patent on Utilization of waste engine heat, filed April 4, 1938, and bearing Serial No. 199,821.

In many of the arts and industries it is advantageous to treat a material as by heating or drying, incident to the mechanical processing, cleansing, finishing, calendering, or otherwise mechanically altering the dry material. An example is found in the ginning of cotton, wherein it has been determined that removal of trash from the seed cotton is relatively easier when the cotton and foreign matter are both comparatively dry. It is accordingly to the attainment of a more efficient drying process and a reduction of the expense thereof, that the present invention is primarily directed.

Another object of the invention, more particularly stated, consists in the utilization of heat, for the purpose of effecting the drying of cotton incident to ginning thereof, from either or both the exhaust and cooling water of an internal combustion engine utilized as the prime mover for the cotton gin. By the utilization of the improved apparatus for the purpose, the overall efficiency of the entire ginning plant, and the efficiency of the engine, are obviously considerably enhanced.

Incident to the foregoing it is within the purview of the present invention and is stated as an object thereof, to provide for means utilizing the waste engine heat at least in substantial proportion, for maintaining a stream of air for cotton drying, at a substantially constant temperature.

Yet another object of the invention is attained in a series of heat exchange devices which are correlated in design and functionally unified by their connection into a common hot air supply system, the units being supplied with heat from an internal combustion engine or the like, and this engine being employed as a source of mechanical power for ginning the cotton while subject to thermal treatment, as by a warm air stream conducted through a duct system.

Still another object of the invention is attained in a device for some or all of the purposes aforesaid, and which may be easily utilized for the incidental purpose of ventilating the power plant enclosure and gin-enclosing structures, or a common housing therefor.

The foregoing and numerous other objects will appear from the following detailed description of a presently preferred embodiment of the invention, when considered in connection with the accompanying drawings, in which:

Fig. 1 is a top or plan view, partly diagrammatic in nature, of the various elements in an engine waste-heat recovery system, utilized in combination with a cotton ginning plant powered by an internal combustion engine; Fig. 2 is a vertical longitudinal section of an assembly embodying as a unitary structure, a combined radiator, exhaust-heat exchanger and air furnace, the plane of this section being indicated by line 2—2 of Fig. 1; Fig. 3 is a staggered transverse vertical section through a portion of the device of Fig. 2, and as taken along line 3—3 of Fig. 1, and Fig. 4 is a broken horizontal section as viewed along line 4—4 of the device shown by Fig. 2.

Referring now by characters of reference to the drawings, there is selected for exemplification of the invention, a cotton gin 10 which may be of any suitable or known type, and which is not illustrated in detail since the ginning equipment per se forms no part of the present invention. It is however contemplated that the present invention may be applied not only to the drying of seed cotton prior to its actual mechanical treatment in the gin, but also may be utilized as a source of heated air for use in air-blast gins wherein a stream of air under substantial velocity is directed to one or more, usually a plurality, of air-blast nozzles serving continuously to force streams of air substantially across the periphery of the gin saws. This specific mode of utilization of an air-blast in connection with a rapidly rotating gin saw, may be, for example, such as disclosed in U. S. Patent No. 1,827,183 issued October 13, 1931, to C. A. Bennett. It will be understood for purposes of present description that the enclosure 10 contains suitable air-blast ginning equipment, with or without equipment suitable for pre-drying the cotton, i. e., thermally conditioning it prior to the time when the seed cotton is actually exposed to the gin saws and air-blast.

A power supply shaft 11 for the gin is shown in Fig. 1 as actuated by a power pulley 12 driven as by a belt 13, from pulley 14 secured to an engine drive shaft 15; the latter is conveniently installed as a countershaft, from which may also be driven several of the power-requiring accessories incident to the present process and system.

An engine 20 may be of Diesel type or may consist of some other suitable form of internal combustion engine of the power rating necessary to care for the power demands of the gin 10. The engine 20 may consist of a single cylinder engine, or of a multi-cylinder engine, as diagrammatically represented. It is, however, preferably water cooled, the jacket structure being indicated generally at 21 provided with a water circulating pump (not shown), and jacket discharge piping 22 which leads to a cooling water radiator 23, the water being directed therefrom as by return piping 24, leading to the cylinder block and jacket of the engine.

It is a preference in assembling the parts of the system, to provide the engine with an enclosing hood 30. This may be conveniently fabricated of steel sheet, and if desired, lined with a thermal insulating material 31 which serves the purpose of conservation of radiated heat, and in some measure as a deadening material for sound-proofing purposes. An air inlet to the hood 30 is shown at 32, and may have its entrance port at some desired point in the gin building or power plant structure, whereby to serve as may be desired, for ventilation purposes. An air outlet throat 35 is provided, to cause a convergence of the air stream after passing over the engine. The air is directed as indicated by the arrows in Fig. 1, across the engine 20, thence into the outlet throat of the hood. In the course of the air travel through the enlarged portion of the hood 30, the air stream will obviously be raised somewhat in temperature due to the effect of direct external radiation of the engine jacket. If, as is much less usual, an air-cooled engine be employed, the radiator 23 and jacket 21 would of course be omitted, in which case the direct engine radiation into the incoming air stream would obviously be at a much higher value.

The radiator 23 may be of any suitable or usual type, either of tubular form, of cellular type, or of tube and fin type, the particular form of the radiator not being material, except that its design should be such as to minimize resistance to the air stream passing therethrough, via the duct elements later to be described. It will have appeared as obvious that the air stream is still further raised in temperature by direct heating effect of the radiator on the air as it is impelled across the hot surfaces of the tubes or cells. It will further have appeared that when utilizing waste jacket heat from the engine, the radiator 23 being of a design, surface area and capacity to accommodate it to the air duct system hereinafter described, nevertheless the provision of such radiator is in lieu of the usual separate engine radiator.

The air stream in proceeding through the throat 35 converges into a duct 36, thence into the eye or inlet portion of a volute 37 of an air displacement device, such as a fan, blower or the like, indicated at 40. The exact form of air displacement device is not material to the invention, but a fan or blower of centrifugal type has been found economical and practical for the purpose noted. The outlet from the fan or blower 40 is connected into a duct section 41, thence through the radiator 23, and thence into the inlet air port hereinafter described, of a combined exhaust heat exchanger and air furnace unit, indicated generally at 42 (Fig. 1), the detail of structure of a suitable form of exchanger and furnace unit more clearly appearing in Figs. 2, 3 and 4, and later herein described more fully.

It is my preference that, for space economy and economy in length of duct, the radiator 23 be formed as a part of, or be supported by the shell of the unit 42. Such a support is arranged by flanged bracket elements 23A, which may be located within or exteriorly of the adjacent portion of duct 41, the brackets being in turn carried by the shell of the exchanger-heater unit 42.

As will later appear, the air stream from duct 41, after traversing the radiator, passes through the exhaust heat exchanger, thence through the air furnace, whether or not the latter is operating, and from the outlet or delivery port of the air furnace, into a duct 50 and into the gin enclosure 10, wherein there are provided the requisite number of branches for supply of the air blast nozzles of the gin, adjacent the gin saws, the latter structure not being illustrated. If necessary to care for the accumulation of air and slight increase in air pressure which might otherwise result in the gin structure 10, there is provided a discharge line or duct 51, leading to atmosphere as through a window of the enclosure about the power plant or the gin.

It has been found convenient to utilize the countershaft 15 as a drive for the fan or blower 40, as through a drive pulley 52, belt 53, driven pulley 54 and fan drive shaft 55. It has also been found convenient to utilize for purposes of external combustion, when necessary to augment the heat derived from the engine and radiator radiation, as augmented by the exhaust heat exchanged into the air circuit in the unit 42, an oil burner 60 which may be of a gun type or any other suitable form, advantageously utilizing the same type of fuel as that employed in engine 20, in case the latter is of Diesel type. The oil burner 60 incorporates therein the usual blower equipment which may be power-driven by a pulley 61, belt 62 and pulley 63 (Fig. 1).

Proceeding now to a description of the combined radiator, exhaust heat exchanger and air furnace unit, the engine 20 is shown as provided with oppositely disposed manifolds 65 and 66, communicating respectively with exhaust pipes 67 and 68 both connected through a common pipe section, to exhaust gas inlet port 70 of the heat exchanger unit. The exhaust gas inlet port is identified with the inlet connection, and leads into the upper portion of the shell 75 about the exhaust heat exchanger, the location of the connection 70 best appearing in Fig. 3. The exhaust entrance connection leads into the upper chamber 76, defined as by a flue or tube sheet 77 and the upper end of the shell. A similar lower flue sheet 78 spans the wall of the exchanger shell slightly above the bottom thereof and forms a chamber 79 in the lower portion of the shell. It will appear from Figs. 2 and 3 particularly, that the hot exhaust gases entering the port and connection 70, pass thence into the chamber 76, thence downwardly through certain of the plurality of parallel vertical spaced tubes 80 in the exchanger, thence into the lower chamber 79, thence upwardly and outwardly through other of the tubes 80, thence into chamber 76A, and out through exhaust stack 85, and to atmosphere. A partition 76B, between the chambers 76 and 76A, thus compels the exhaust gases to traverse the tube assembly of the exchanger in both a downward direction and an upward direction.

The air circuit through the exchanger is provided by an inlet port 86 at the terminus of the duct, just beyond the radiator, and extends throughout the intermediate space 87 in the shell of the exchanger in such manner that the air circulates closely about the tubes, and after being substantially heated by radiation from the exhaust gases, makes its exit into the air circuit of the air furnace, the latter portion of the unit being indicated generally at 90, to distinguish it from the exhaust heat exchanger portion of the unit, indicated generally at 91.

The furnace 90, as will appear from Figs. 2 and 4, is by preference, constructed as a companion unit to the exhaust heat exchanger. Each of the structures 90 and 91 is preferably of vertical tubular type as shown, each of rectangular transverse section (Fig. 4) and the units are assembled in back-to-back relation. This arrangement facilitates removal of either unit without structural disturbance of the other, as for repairs, replacement or service attention. In the event of the removal of either unit for such purpose, the open side remaining as a result of the disassembly, may be temporarily closed as by a flat metal sheet of suitable gauge (not shown), bolted in place as a closure on the remaining unit. Temporary connections may be effected, in such event, in an obvious manner. It may be noted as a preference that a single base structure 95 is provided for the assembly of units 90—91; and that such base structure is itself formed as a rigid unit common to the exchanger-furnace assembly. This conduces to structural stability, and the contiguous assembly of the units 23, 90 and 91, provided for by the radiator location, and by companion flanges 96 and bolts 97, assures a minimum length of travel of the hot air stream between the radiator and exchanger, also between the exchanger and furnace, minimizes heat loss between the several units, minimizes length of duct required, besides assuring compactness of assembly. This latter point is of advantage in the event of installation of the present heat conservation system in existing ginning structures, wherein power plant space is often at a premium.

Proceeding now with a discussion of the air furnace 90, the latter is conveniently constructed internally closely after the manner of the unit 91, being provided with a lower combustion compartment 100, an intermediate compartment 101 about the tubes or flues, and an upper compartment 102, which is or may be in connection with chamber 76A of the heat exchanger. Flue or tube sheets or the like are shown at 103 in the lower portion and 104 in the upper portion of the shell 105. The combustion takes place in obvious manner as in the chamber 100, the products of combustion passing through the tubes 106, thence into the upper chamber 102 and out through the combined exhaust and flue stack 85 to atmosphere.

The air circuit through the furnace unit 90 is confined to the chamber 101 between the flue sheets or headers 103, 104, being the space about the tubes 106. Air delivered to the unit 90, enters the chamber 101 of the unit through the adjoining open ends of the units, the latter providing a common opening indicated at 111 (Figs. 2 and 4). Thus the air circuit through both the tube compartments, is uninterrupted, and the hot air proceeds outwardly from the compartment 101, directly into a transfer or distribution chamber 107, discharging into the duct 50, thence into the gin enclosure 10 or by way of suitable branches (not shown) to the air blast nozzles adjacent the gin saws.

The course of the air through the system and the several units thereof as described, and the operation of the system as a whole are thought to have been fully apparent from the description of parts and their individual function, but it will be noted that, in the event the heat derived from the engine, whether from direct radiation, thermal emission by the radiator, or through the exhaust heat exchanger or any thereof be sufficient to avoid any necessity for augmenting the heat content of the air stream, the furnace is, for reasons of economy, obviously the first unit to be dispensed with in operation.

It will have appeared that, irrespective of whether or not the air furnace is operative, the air stream in traversing the hood 30 is first raised somewhat in temperature above the ambient, by direct radiation from the engine 20, which it will be assumed is in operation to drive the shaft 15, the accessories connected thereto, and the gin equipment proper. After the air stream passes the fan or blower, then traverses the water radiator 23, assuming the engine to be operating at full-load or a substantial proportion of full-load, the air will be further raised in temperature to an extent depending in great measure upon the outside or ambient temperature, and in perhaps a majority of cases, to a temperature of 150–160 degrees F. representing approximately the optimum temperature range for most efficient drying effect of the cotton. The air stream, in proceeding through conduits 36 and 41 under propulsion by the fan or blower 40, is conducted through the radiator and into the exhaust heat exchanger 91, whereupon due to exposure to the hot tubing surfaces in the air circuit of the exchanger, it is still further raised in temperature. The air stream thence will traverse the heating chamber or air circuit within the air furnace, and may be still further heated therein through operation of the burner 60, after which the heated stream passes by way of duct 50 into the gin, cotton dryer, or in part or whole, to the air blast nozzles associated with the ginning equipment.

It will have appeared from the foregoing description that the blower 40 in the location shown by Fig. 1, serves as an induced draft fan in impelling the air through the hood 30 but operates as a blower through the radiator and other portions of the duct system beyond the fan. It is obvious that the blower may be located in other positions than as shown in the duct system, and in relation to the several items of apparatus; for example, it may be located at or near the inlet 32 or ahead of radiator 23, or even beyond the assembly 90—91.

It is important to note that the system to which the present improved air heater and heat exchanger apparatus is particularly adapted, provides for maintaining the air for cotton drying at a substantially constant temperature. Obviously the heat emitted by the radiator and exhaust heater, is dependent greatly upon a fluctuating condition of engine loading, and is therefore variable. For the purpose of equalizing such occasional variations in engine waste heat, the air heater or furnace unit 90 is available as a standby unit, for example during a starting or warming up period, or whenever necessary to augment the engine waste heat to bring the air stream to the minimum temperature necessary for drying purposes, for example, 150–160 degrees. Whenever the heat supplied by the cooling water and exhaust is inadequate to bring the air stream to this temperature, the burner 60 may be operated to make up whatever deficiency may exist.

It will have appeared that the system as described is exceedingly flexible as to the range of heat supply. Obviously the radiator heat may be used alone, as a sole thermal source for the drying air stream. The next greater stage of heat supply would consist in utilizing engine and radiator heat, together with the exhaust exchanger, and a still greater supply is obtainable through the use of these elements together with the air furnace or heater.

It will be noted that all of the several heating elements characterizing the present invention are comparatively inexpensive, and may be assembled as a compact unit in the immediate vicinity of the engine, usually within the engine room, so as to be readily accessible to the ginner at all times. Furthermore, the two major waste-heat recovery units, viz., the radiator 23 and exhaust heat exchanger 91, do not of themselves add any additional elements to the system, the present practice consisting merely, in most instances, of utilizing a standard radiator in the duct system to adapt it for the present purpose. Since some form of exhaust pot, muffler or silencer is almost invariably provided with the engine, these more conventional elements become unnecessary since their function is performed by the present exhaust exchanger which serves efficiently as a silencer. Furthermore, the formerly prevailing practice of utilizing a distinct radiator fan is obviated by using the fan or blower 40, serving the dual purpose of a radiator cooling fan and an impelling agency for moving the air through the ducts and units of the system.

As has been briefly mentioned heretofore, the heating system characterizing the present invention, provides admirably for ventilation of the ginning plant. To this end, the radiator may be disposed within the engine room, as may the exhaust heat exchanger and any other or all of the elements referred to. Since the fan has, in most instances, a capacity of about 5,000 cubic feet per minute, this amount of air is taken by the system from the interior of the plant, is forced through the heating system and discharged to the atmosphere through the dryer or gin. The air intake may be through an open window, door or other opening in the ginning plant structure.

Although the invention has been described by making specific reference to a preferred and inclusive combination and an advantageous arrangement of mechanically and thermally related elements, it will be understood that numerous changes may be made in the elements, as well as in their arrangement, and further in the utilization of numerous sub-combinations of the items of apparatus disclosed, all without departing from the full intended scope of the invention as defined by the appended claims.

I claim:

1. An air heater assembly providing at least two air heating sections combined to form a unit, said assembly including a casing structure forming an enclosed body for the unit, spaced tube plates located inwardly of the opposite ends of the casing and forming, with the casing, end chambers therein, tubes connecting the spaced tube plates, and opening at their opposite ends into said end chambers, a hot fluid inlet conduit connected into one end chamber of one of said air heating sections of the assembly, combustion means in one end chamber of the other of said air heating sections of the assembly, a flue connected to the opposite chamber of the first said heating section of the assembly, and serving as an outlet duct for spent gases from the first said section, an air inlet connection to the space between the tube plates in the first said section, a liquid radiator in said inlet connection, adjacent the first said section, and an air outlet duct directed from the space about the tubes in said other heating section of the assembly, the tube-containing portions of said air heating sections of the assembly being in substantially open communication with each other, so as to permit a circulation of air therebetween, and from the air inlet connection to the air outlet duct.

2. An air heater assembly providing at least two air heating sections combined to form a unit, said assembly including a casing structure forming an enclosing body for the unit, spaced tube plates located inwardly of the opposite ends of the casing and forming with the casing, end chambers therein, tubes connecting the spaced tube plates, and opening at their opposite ends into said chambers, a hot fluid inlet conduit connected into one end chamber of one of said air heating sections of the assembly, a hot fluid outlet duct directed outwardly of another chamber of said one of said air heating sections, combustion means in one end chamber of the other of said air heating sections of the assembly, coacting with the tubes to pass hot gases to the opposite chamber of the said other heating section of the assembly, thence into the outlet duct, an air inlet connection to the space between the tube plates and about the tubes in the first said air heating section a liquid radiator in said inlet connection, adjacent the first said air heating section, an air outlet duct directed from the space about the tubes in said other heating section of the assembly, the tube-containing portions of said air heating sections of the casing being in substantially open communication with each other so as to permit free movement of air from said air inlet duct, to the air outlet duct; the casing structure enclosing the unit, being formed of two companion portions connected to each other along a substantially median plane parallel to the tubes, whereby, when desired, the first said heating section and said other heating section may be detached from each other, and either unit adapted for operation separately, the connection between the two said sections of the unit being such as to enable attachment of a substantially planar closure element along the parting plane of either section of the unit when removed from the other.

ROBERT D. WILLIAMS.